(12) United States Patent
Kaehn et al.

(10) Patent No.: US 7,441,046 B2
(45) Date of Patent: Oct. 21, 2008

(54) SYSTEM ENABLING SERVER PROGRESSIVE WORKLOAD REDUCTION TO SUPPORT SERVER MAINTENANCE

(75) Inventors: Keith Kaehn, Phoenixville, PA (US); Xiping Song, Cranbury, NJ (US); John D. Haley, Honey Brook, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 841 days.

(21) Appl. No.: 10/783,133

(22) Filed: Feb. 20, 2004

(65) Prior Publication Data

US 2005/0021771 A1 Jan. 27, 2005

Related U.S. Application Data

(60) Provisional application No. 60/451,594, filed on Mar. 3, 2003.

(51) Int. Cl.
*G06F 15/16* (2006.01)
(52) U.S. Cl. ........................ 709/245; 709/229
(58) Field of Classification Search .................. 709/218
See application file for complete search history.

(56) References Cited

U.S. PATENT DOCUMENTS

| 6,163,849 | A | 12/2000 | Nouri et al. ................. 713/324 |
| 6,199,110 | B1 | 3/2001 | Rizvi et al. .................. 709/227 |
| 6,266,697 | B1 | 7/2001 | Miyamoto ................... 709/224 |
| 2002/0112014 | A1* | 8/2002 | Bennett et al. .............. 709/206 |
| 2002/0112034 | A1* | 8/2002 | Feik ........................... 709/219 |
| 2002/0161745 | A1* | 10/2002 | Call ............................. 707/1 |
| 2002/0169889 | A1* | 11/2002 | Yang et al. .................. 709/244 |
| 2003/0014504 | A1 | 1/2003 | Hess et al. .................. 709/220 |

* cited by examiner

*Primary Examiner*—Jason Carodne
*Assistant Examiner*—Ryan J Jakovac
(74) *Attorney, Agent, or Firm*—Alexander J. Burke

(57) ABSTRACT

A data switching system, having a switch processor, directs requests to initiate a new operation session of an executable application. The switch processor parses received data representing a received universal resource locator (URL) to identify whether the received URL is associated with a request to initiate an operation session of an executable application. If the received URL is associated with a request to initiate an operation session, the switch processor initiates a data access request at a second URL address hosted by a particular server. In response to receiving a response indicating success of the data access request at the second URL address hosted by the particular server, the switch processor directs the request to initiate the operation session of the executable application to the particular server.

18 Claims, 6 Drawing Sheets

300
User Interface Window Showing an Active Server Icon

FIG. 3

400
User Interface Window Showing a Draining Server Icon

FIG. 4

500
User Interface Window Showing Configurations for Draining a Server

600
User Interface Window Showing Server Farm Activity

SYSTEM ENABLING SERVER PROGRESSIVE WORKLOAD REDUCTION TO SUPPORT SERVER MAINTENANCE

CROSS-REFERENCE TO RELATED APPLICATIONS

The present application is a non-provisional application of provisional application having Ser. No. 60/451,594 filed by Keith Kaehn et al. on Mar. 3, 2003.

FIELD OF THE INVENTION

The present invention generally relates to computer information systems. More particularly, the present invention relates to a system enabling server progressive workload reduction to support server maintenance.

BACKGROUND OF THE INVENTION

The growth of network services, for example Internet services or intranet services, has made significant demands on the availability and performance of Internet and intranet sites and the computer servers supporting the sites. Growth in the demands is related to increasing numbers of users, increasing complexity of applications, and increasing demands for better service. To address performance and reliability issues associated with the growth in demand, the sites use one or more switches to assign requests from multiple users to multiple servers.

Users access the network services using a client having a browser. The browser provides a user interface between the user and the client, and the sites. Typically, a user is permitted to run a single business session (e.g., a shopping cart) on a single browser. If the user wants to run a new business session (e.g., a new shopping cart), the user typically needs to end the current business session on the browser and start a new business session on the browser. The user may also run the new business session by opening a new browser.

Some software applications support running multiple, concurrent, business sessions on a single browser. A challenge in implementing these applications is determining how to assign each business session to one of the multiple servers. The server holds state information (otherwise referred to as "stateful information") related to user requests for one or more business sessions on behalf of the client. Executing stateful business sessions on more than one server can cause the servers to fail to retrieve the correct information, since the desired information might reside on a different server. For example, when running a shopping cart business session on two servers, each server may only have part of the orders in the shopping cart.

Prior systems implemented server assignments at different levels by using different methods, such as those based on an internet protocol (IP) address, a session cookie, and a universal resource locator (URL) session identification (ID).

The IP address method provides assignment of a server at the client level. A content switch balances the load depending on different IP addresses (and/or port number) of a client. When each client has an independent, different IP address, the load can be balanced among the servers and the business sessions from the same client can be assigned to the same server.

The session cookie method provides assignment of a server at the browser or user level. The session cookie is an identifier passed together with a client request to a server to identify a session and a corresponding request. With the session cookie, the server can know which session the request is from. The content switch detects the session cookie from a user's browser and assigns (i.e., "sticks") the requests from the same Hyper Text Transfer Protocol (HTTP) session to a server. If the cookie timeout is not set, the session cookie will be available until a user closes a browser. Thus, the requests from the newly opened browser can be re-distributed among the servers. If the cookie timeout is set, when this user session ends, the HTTP requests from the browser are re-distributed.

The URL session ID method provides assignment of a server by using a business session ID as a parameter of the URL. This method may involve having a dedicated server that generates the business session IDs and assigns a business session ID for each new business session. Hence, a client requests a new business session ID before starting each new business session, which generates additional communication between the client and the server. The client who has requested to start the business process receives the business session ID, and includes the business session ID as a parameter in the URLs that start the business session or make subsequent requests. The content switch assigns these request to a server based upon the evaluation of the business session ID by a sorting method in the content switch.

Load balancing permits the network load to be distributed dynamically and efficiently to each of multiple network service servers according to its status. Since loads are balanced based upon information from the clients or users, the load may not be evenly distributed.

In recent years, as network services have increased with the rapid spread of Internet/Intranet, the demand has increased for more efficient utilization of the client server system and increasing the stability of services of servers. In particular, there is a demand for an environment, which permits centralized access to the World Wide Web (WWW) server to be circumvented and failures to be hidden. For this reason, some systems provide two or more servers (or nodes) to perform one service (e.g., ftp (file transfer protocol), HTTP (Hyper Text Transfer Protocol), telnet, or the like).

In order to implement services with stability, it is required to distribute services to each server suitably. On the other hand, the network services have become increasingly diversified, complicated, and advanced, and the frequency at which changes are made to the configuration of a group of servers and the service distribution method has increased. The demand also has increased for circumventing terminates of some services due to some servers going down unexpectedly. Existing techniques of distributing services to multiple servers include Round-robin Domain Name Server (DNS), load distribution hardware, and an agent.

In the Round-robin DNS service, an entry table is set up in which multiple-server Internet Protocol (IP) addresses are mapped to one domain name. When a client makes an inquiry about a server IP address, servers are allocated to the client on a round robin basis. According the entry table and the IP addresses of the allocated servers, servers are presented to the client to distribute services to multiple servers. However, in the Round-robin DNS service, services are distributed to servers equally or at simple rates and each server has to perform services allocated to itself irrespective of its capabilities and dynamic load conditions. This produces a difference in load condition between each server, resulting in reduced efficiency of the whole system. Further, in the event that a server has gone down and the configuration of the server group has to be modified, it is required to manually make such a change to the server group configuration to delete a server that went down from the entry table. This change is made each time a server goes down. It is therefore difficult to cope with such a situation immediately. As a result, the whole system may have to be stopped temporarily.

In using load distribution hardware, a hardware device is placed between a server group and a network to relay communications between clients and servers. Load measuring communications are made between the hardware device and each server. Packets to be relayed are monitored to measure the number of connections to each server and its response time, thereby detecting the load condition of each server and distributing services to the servers accordingly. However, the hardware has high implementation costs. The employment of this system is limited because the hardware is not incorporated into each server. In addition, since communications for load measurement are needed between each server, extra load, which is different from original communications, is imposed on each server, which further increases traffic and may cause servers to go down. Furthermore, since the load is measured on a packet-by-packet basis, the servers may be switched even in mid-service causing errors to occur.

An agent residing on each server in a server group measures a load on its central processing unit (CPU) and its disk utilization to see its load condition. The load distribution system is notified of the load condition of each server and distributes services to the servers accordingly. However, since the agent function resides on each server, the server has to be modified at the time the agent is installed. The agent is also compatible with the server's operating system (OS). The load measurement is made for each server, resulting in an increase in the load on the server. Since the load is measured on a packet-by-packet basis, the servers may be switched even in mid-service causing errors to occur, as with the hardware device.

Draining a server involves gradually clearing the processing of the users requests on the server for service maintenance. Terminating the processing of the users requests on the server interrupts user applications. Draining a server in a user-based, load-balancing environment can cause existing business sessions to be interrupted. Interrupted users may have to login again and re-start business sessions, which can lead to the loss of the data which has been previously entered.

Servers may be drained by stopping servers from accepting new HTTP connections, while the servers continue processing the requests from existing HTTP connections for a predetermined time, or by removing a server from a content switch rule that starts a business session.

In the first method, a server is stopped from accepting any new HTTP connections for a predetermined time, such as twenty minutes, which is a default time-out for session cookie. After the predetermined period expires, the server is suspended for the services. For example, Microsoft® Application Center 2000 uses this method. This method works for stateless web applications that can execute properly regardless of the application state on the server. However, the first method may cause a user application to be interrupted under any one of the following three circumstances. In a first circumstance, a stateful business session running on the server might be interrupted, because the existing HTTP connection for the session might be closed before the session ends. The server load or other external factors (e.g., server is configured not to use persistent HTTP connection) may cause the session to be closed before the session ends. In a second circumstance, a user of an application uses one Microsoft® active server page (ASP) session to create application specific stateful sessions. Since an application session might be created during an ASP session and it might run longer than the ASP session timeout, the HTTP connection might be closed before the application business session ends. In a third circumstance, a client device or a load-balancing device forces a close of the HTTP connection before the business session ends. This occurs when the load-balancing device is configured to check certain HTTP requests.

In the second method, a system/network administrator accesses a content service switch device and modifies its rules of operation to remove a server from the content switch rule that starts the business session. The removed server does not start any new business session. Typically, the group of people maintaining the content switch is different from the group maintaining the application servers. Therefore, this second method requires modification of the content switch and may cause coordination problems among different maintenance groups.

It would be desirable to have a system drain servers that have stateful data before removing them from a service pool. Accordingly, there is a need for a system enabling server progressive workload reduction to support server maintenance that overcomes these and other disadvantages of the prior systems.

SUMMARY OF THE INVENTION

The inventors have advantageously recognized that it would be desirable for a server to finish ongoing sessions that have been initiated by the users, while rejecting requests to initiate new business sessions. Further, it would be desirable to remove a server from a service pool, after the ongoing business sessions are finished. In such a system, users should not experience application interruptions.

According to one aspect of the present invention, a data switching system, having a switch processor, directs requests to initiate a new operation session of an executable application. The switch processor parses received data representing a received universal resource locator (URL) to identify whether the received URL is associated with a request to initiate an operation session of an executable application. If the received URL is associated with a request to initiate an operation session, the switch processor initiates a data access request at a second URL address hosted by a particular server. In response to receiving a response indicating success of the data access request at the second URL address hosted by the particular server, the switch processor directs the request to initiate the operation session of the executable application to the particular server.

DETAILED DESCRIPTION OF THE PREFERRED EMBODIMENTS

Figure 1:
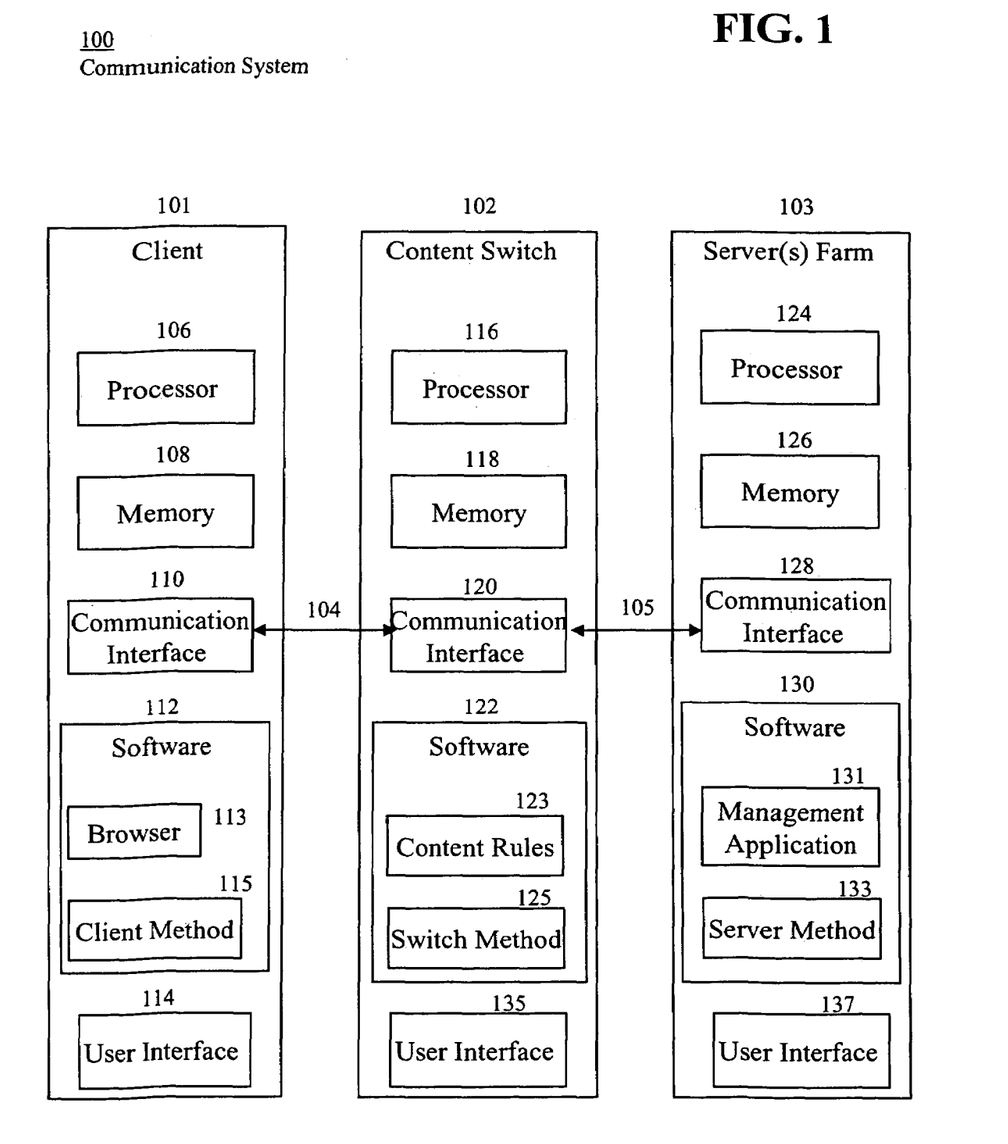
FIG. 1 illustrates a communication system, in accordance with a preferred embodiment of the present invention.

FIG. 1 illustrates a communication system 100 (herein called the "system," and otherwise called a "data switching system"), in accordance with a preferred embodiment of the present invention. The system 100 generally includes a client 101, a content switch 102 (herein called the "switch"), one or more servers 103, a first communication network 104, and a second communication network 105.

Preferably, the system 100 is intended for use by a healthcare provider that is responsible for monitoring the health and/or welfare of people in its care. Examples of healthcare providers include, without limitation, a hospital, a nursing home, an assisted living care arrangement, a home health care arrangement, a hospice arrangement, a critical care arrangement, a health care clinic, a physical therapy clinic, a chiropractic clinic, and a dental office. In the preferred embodiment of the present invention, the healthcare provider is a hospital. Examples of the people being serviced by the healthcare provider include, without limitation, a patient, a resident, and a client.

The client 101 includes a processor 106, a memory 108, a communication interface 110, software 112, and a user interface 114. The software 112 further includes a browser 113 and a client method 115. The client 101 is preferably implemented as a personal computer. The personal computer may be fixed or mobile and may be implemented in a variety of forms including, without limitation, a desktop computer, a laptop computer, a personal digital assistant (PDA), and a cellular telephone. Each of the referenced elements, as well as other known elements not shown, in the client 101 are interconnected in a manner well known to those skilled in the art of client devices or systems.

Preferably, the user interface 114 in the client 101 generally includes an input device (not shown) that permits a user to input information into the client 101 and an output device (not shown) that permits a user to receive information from the client 101. Preferably, the input device is a keyboard, but also may be a touch screen, or a microphone with a voice recognition program, for example. Preferably, the output device is a display, but also may be a speaker, for example. The output device provides information to the user responsive to the input device receiving information from the user or responsive to other activity by the client 101. For example, the display presents information responsive to the user entering information in the client 101 via the keyboard.

Preferably, browser software 113 cooperates with the user interface 114 by permitting information to be entered into the browser software 113 and by permitting information to be displayed by the browser software 113. Each of the switch 102 and the server(s) 103 may also have a user interface 135 and 137, respectively, having an input device and an output device, which operates in the same or different way than the user interface 114 of the client 101.

The processor 106, the memory 108, and the communication interface 110 are each well known to those skilled in the art of client systems. The memory 108 stores the software 112. The software 112 includes the browser software 113 and the client method 115. The client method 115 is described in further detail in FIG. 2. The communication interface 110 is adapted to send and/or receive wired or wireless communications over the first communication path 104.

The switch 102 further includes a processor 116 (otherwise called a "switch processor"), a memory 118, a communication interface 120, software 122, and a user interface 135. The switch 102 connects one or more clients 101 to one or more servers 103 via the first communication network 104 and via the second communication network 105. The user interface 135, in combination with browser software (not shown) if desired, may also be used with the switch 102, as described with the client 101, if required or desired. The software 122 further includes content rules 123 and a switch method 125. Each of the referenced elements, as well as other known elements not shown, in the switch 102 are interconnected in a manner well known to those skilled in the art of switches.

The processor 116, the memory 118, and the communication interface 120 are each well known to those skilled in the art of content switches. The memory 118 stores the software 122. The software 112 includes the content rules 123 and the switch method 125. The content rules 123 and the switch method 125 are described in further detail in FIG. 2. The communication interface 120 is adapted to send and/or receive wired or wireless communications over the first communication path 104 and over the second communication path 105.

Figure 3:
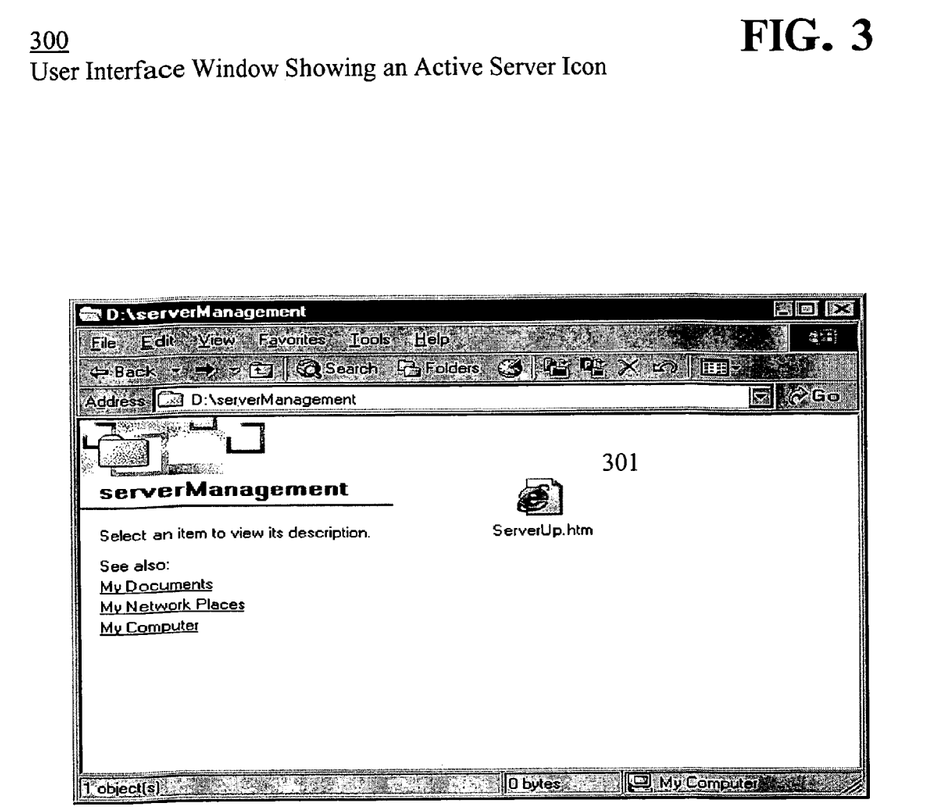
FIG. 3 illustrates a user interface window showing an active server icon, in accordance with a preferred embodiment of the present invention.
Figure 4:
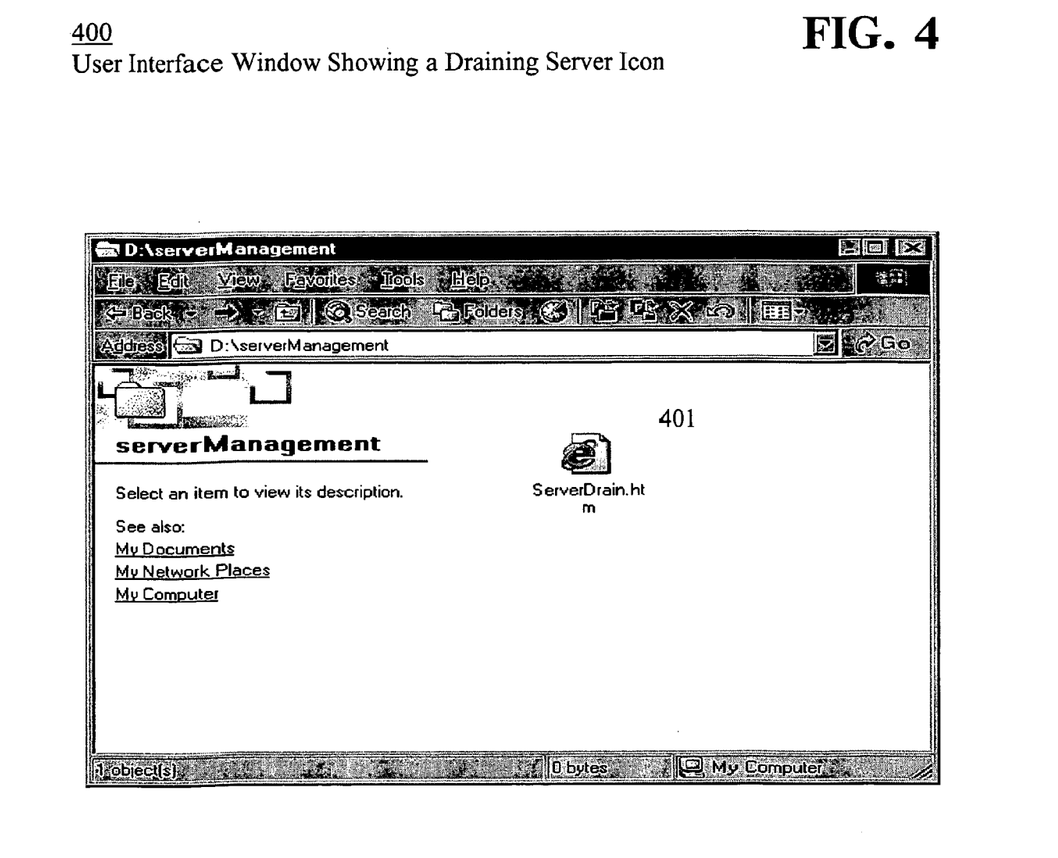
FIG. 4 illustrates a user interface window showing a draining server icon, in accordance with a preferred embodiment of the present invention.

Each of the server(s) 103 further includes a processor 124, a memory 126, a communication interface 128, software 130, and a user interface 137, wherein the processor 124 and the communication interface 128 alone or combined are otherwise called an "interface processor." Preferably, the server 103 is implemented as a personal computer, a workstation, or other network based system. The user interface 137, with browser software (not shown) if desired, may also be used with one or more of the server(s) 103, as described with the client 101, if required or desired, as shown in FIGS. 3 and 4, for example. The software 130 further includes a management application 131 and a server method 133. Each of the referenced elements, as well as other known elements not shown, in the server(s) 103 are interconnected in a manner well known to those skilled in the art of servers.

Preferably, the server(s) 103 operate as identical copies of each other and are able to handle the requests received from the second communication network 105. Preferably, tasks should be distributed equally among the individual servers 103 to balance the overall loading of the servers 103 in order to obtain optimum performance. To achieve this, it is necessary to direct the individual requests arriving from the first communication network 104 to the individual servers 103.

The processor 124, the memory 126, and the communication interface 128 are each well known to those skilled in the art of servers. The memory 126 stores the software 130. The software 130 includes the management application 131 and the server method 133. The management application 131 and the server method 133 are described in further detail in FIG. 2. The communication interface 128 is adapted to send and/or receive wired or wireless communications over the second communication path 105.

The first communication path 104 provides communications between the client 101 and the switch 102. The second communication path 105 provides communications between the switch 102 and the server(s) 103. The term "path" may otherwise be called a network, a link, a channel, or a connection. The first communication path 104 and the second communication path 105 may be the same path or different paths, depending on the particular system.

The communication path 104 may be formed as a wired or wireless (W/WL) connection. A wireless connection advantageously permits the client 101 to be mobile beyond the distance permitted by the wired connection. Preferably, the communication path 104 is formed as a wired connection. In the case of a wired connection, the IP address is preferably assigned to a physical location of the termination point of the wire, otherwise called a jack. The jack is mounted in a fixed location relative to the client 101. In the case of a wireless connection, the IP address is preferably assigned to the client 101, since the client 101 would be mobile. The communication path 105 also may be formed as a wired or wireless (W/WL) connection.

Each of the paths 104 and 105 may be formed as any type of network including, without limitation, a Local Area Network (LAN), such as an Intranet, for example, and a Wide Area Network (WAN), such as an Internet, for example. Preferably, the first communication path 104 is formed as the WAN, such as the Internet, and the second communication path 105 is formed as a LAN, such as the Intranet.

The Internet is a decentralized network of computers that communicate with one another via the TCPIP. The explosive growth in use of the Internet is due in part to the development in the early 1990's of the worldwide web (WWW), which is one of several services provided on the Internet. Other services include, without limitation, communication services such as Email, file transfer protocol (FTP), telnet, newsgroups, internet relay chat (IRC), instant messaging, information search services such as Google™ and AltaVista™, and information retrieval services such as File Transfer Protocol (FTP).

The WWW is a client-server based service that includes a number of servers 103 (computers connected to the Internet) on which web pages or files reside, as well as clients 101 having web browsers 113, which provide a user interface for the users to the web pages. The web browser 113, such as Explorer™ (MicroSoft Corp.) or Navigator™ (Netscape Communication Corp.), send a request over the WWW to a server requesting a web page identified by a uniform resource locator (URL), which notes both the server where the web page resides and the file or files on that server 103 which make up the web page. The server 103 sends a copy of the requested file(s) to the web browser 113, which in turn displays the web page to the user. The web pages on the WWW may be hypermedia documents written in a standardized language called Hyper Text Markup Language (HTML). A typical web page includes text together with embedded formatting commands, referred to as tags, which can be used to control font size, font style and the like. The web browser 113 parses the HTML script in order to display the text in accordance with the specified format.

Each of the communication paths 104 and 105 may use any type of protocol, otherwise called data format, including, without limitation, an Internet Protocol (IP), a Transmission Control Protocol Internet protocol (TCPIP), a Hyper Text Transmission Protocol (HTTP), an RS232 protocol, an Ethernet protocol, a Medical Interface Bus (MIB) compatible protocol, a Local Area Network (LAN) protocol, a Wide Area Network (WAN) protocol, an Institute Of Electrical And Electronic Engineers (IEEE) bus compatible protocol, and an Health Level Seven (HL7) protocol.

Each of the paths 104 and 105 may use any type of address scheme including, without limitation, an address corresponding to a type of protocol described above, and a Universal Resource Locator (URL), otherwise called a web page address.

Each of the paths 104 and 105 may communicate any type of data for any type of application including, without limitation, still pictures, streaming video, audio, telephone messages, computer programs, messages, instructions, and Emails.

Figure 2:
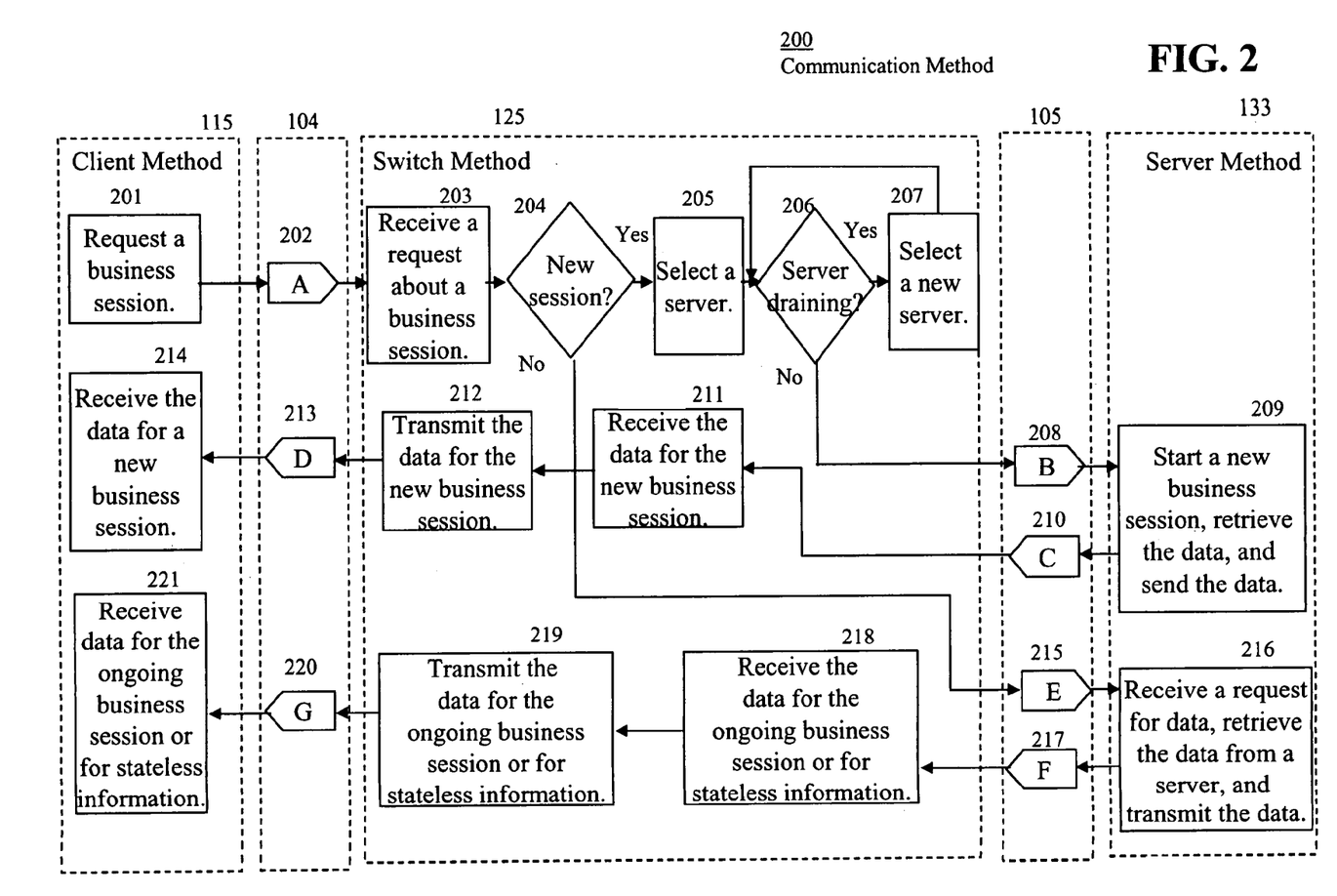
FIG. 2 illustrates a method performed by the communication system, as shown in FIG. 1, in accordance with a preferred embodiment of the present invention.

FIG. 2 illustrates a communication method 200 for the communication system 100, as shown in FIG. 1, in accordance with a preferred embodiment of the present invention. The method 200 generally includes the client method 115, the switch method 125, the server method 133, the first communication network 104, and the second communication network 105. The client method 115 further includes steps 201, 214, and 221. The switch method 125 further includes steps 203, 204, 205, 206, 207, 211, 212, 218, and 219. The server method 133 further includes steps 209 and 216. The first communication path 104 further includes communications 202, 213, and 220. The second communication path 105 further includes communications 208, 210, 215, and 217.

Generally, the communication system method 200 follows consecutively numbered steps and communications starting at step 201 through and ending with step 221.

At step 201, the method 200 starts in the client method 115 by the client 101 sending a request about a business session (otherwise called an "operation session of an executable application"). The business session may be, for example, Microsoft Active Server Page (ASP), Java Server Pages (JSP) based, or user application specific. Preferably, the request is in the form of a hypertext transfer protocol (HTTP) message including a universal resource locator (URL) address (otherwise called a "first URL address"). HTTP is an application layer network protocol built on top of transmission control protocol (TCP). TCP corresponds to the transport layer (i.e., layer 4) in an open system interconnection (OSI) model having seven layers. HTTP allows web browsers and web servers to communicate. HTTP clients and servers communicate via request and response messages. The three main HTTP message types are GET, POST, and HEAD, as are well known to those skilled in the art of HTTP.

In the preferred embodiment of the present invention, different domain names in the URL address direct the HTTP requests from the client 101 to different content rules 123 in the switch 102. Preferably, the different domain names in the URL address identify the URL address as having different types. For example, a domain name in the URL address is of a first type when the URL domain name identifies a server. More particularly, the URL domain name identifies a server when the URL domain name contains an application service page (ASP) extension.

For example, HTTP requests from the client 101 for stateless information (e.g., data or documents) use domain name //perf07.Soarian.net/sms-tnt/*. Preferably, HTTP requests from the client 101 for stateless information have one or more of a .gif extension, a .js extension, a .jpeg extension, and a .html extension. Further, for example, HTTP requests from the client 101 to start a new business session use domain name //perf27.Soarian.net/sms-tnt/*. Still further, for example, HTTP requests from the client 101 to obtain data for an ongoing business sessions use domain name //perf17.Soarian.net/sms-tnt/*.

The content rule 123 in the switch 102 for the HTTP requests from the client 101 for stateless information is defined, for example, as:

content SRF0_srf_Perf23_fqdn
    vip address 10.2.0.200
    protocol tcp
    port 80
    url "//perf07.srfnet.net/sms-tnt/*"
    add service ltntapp01_http
    add service ltntapp02_http
    active A corresponding service definition for the HTTP requests from the client 101 for stateless information is defined, for example, as:

service ltntapp01_http
    ip address 10.2.0.142
    protocol tcp port 80
string ltntapp01
active The content rule 123 in the switch 102 for the HTTP requests from the client 101 for an ongoing business session is defined, for example, as:
content SRF0_srf_Perf21_fqdn
vip address 10.2.0.200
protocol tcp
port 80
url "//perf17.srfnet.net/sms-tnt/*"
advanced-balance url
string prefix "server="
string eos-char "&"
string range 50 to 250
add service ltntapp02_http
add service ltntapp01_http
no persistent
active A corresponding service definition for the HTTP requests from the client 101 an ongoing business session is defined, for example, as:
service ltntapp02_http
ip address 10.2.0.143
protocol tcp
port 80
string ltntapp02
active The content rule 123 in the switch 102 for the HTTP requests from the client 101 to start a business session is defined, for example, as:
content SRF0_srf_sbb_fqdn
vip address 10.2.0.200
protocol tcp
port 80
url "//perf27.Soarian.net/sms-tnt/*"
add service ltntapp01_sbb_http
add service ltntapp02_sbb_http
active At communication 202, the first communication path 104 communicates the request from the client 101 to the switch 102 responsive to step 201.

At step 203, the switch 102 receives the request about the business session from the client 101 responsive to communication 202.

At step 204, the switch 102 determines whether to start (i.e., initiate) a new business session or obtain data for an ongoing business session or stateless information responsive to step 203. If the switch 102 makes a positive determination at step 204 (i.e., to start a new business session), the method 200 continues to step 205 in the switch method 125. If the switch 102 makes a negative determination at step 204 (i.e., to obtain data for an ongoing business session or stateless information), the method 200 continues to step 215 in the server method 133. The determination at step 204 is otherwise called "parsing."

Preferably, the switch 102 makes the determination at step 204 responsive to the URL address in the request received by the switch 102 at step 203. For example, when the switch 102 determines that domain name //perf07.Soarian.net/sms-tnt/* has been received, the content rules 123 for the stateless information are triggered. Further, for example, when the switch 102 determines that domain name //perf27.Soarian.net/sms-tnt/* has been received, the content rules 123 for a new business session are triggered. Still further, for example, when the switch 102 determines that domain name //perf17.Soarian.net/sms-tnt/* has been received, the content rules 123 for an ongoing business session are triggered.

At step 205, the switch 102 selects a server 103 on which to start a new business session responsive to a positive determination at step 204. Preferably, the switch 102 selects a server 103 responsive to a predetermined load balancing method. Preferably, vendors of the switch 102 provide the predetermined load balancing methods.

At step 206, the switch 102 determines whether the selected server 103 is presently draining (i.e., not available or not alive for new business sessions) responsive to step 205. If the switch 102 makes a positive determination at step 206 (i.e., the selected server 103 is presently draining), the method 200 continues to step 207 in the switch method 125. If the switch 102 makes a negative determination at step 206 (i.e., the selected server 103 is not presently draining), the method 200 continues to communication 208 in the second communication path 105.

Preferably, the switch 102 uses a "keepalive" URL (otherwise called a "second URL address") having a domain name /sms-tnt/HTML/public/ServerUp.htm to determine if the selected server 103 is being drained or not. The received (first) URL address may be the same as or different from the second URL address. The switch 102 sends a HTTP head request to the selected server 103. If the HTTP response is #200, for example (i.e., a success), the HTTP head request has been processed properly, and the switch 102 considers the selected server to be not draining (i.e., available and alive for a new business session), and the HTTP request from the client 101 is assigned to the selected server. Alternatively, if the HTTP response is not #200, for example (i.e., a failure), the HTTP head request has not been processed properly, and the switch 102 considers the selected server to be draining (i.e., not available and alive for a new business session), and another server is selected. Service definitions for "keepalive" URL are defined, for example, as:
service ltntapp01_sbb_http
ip address 10.2.0.142
protocol tcp
port 80
keepalive url "/sms-tnt/HTML/public/ServerUp.htm"
keepalive type http
active
service ltntapp02_sbb_http
ip address 10.2.0.143
protocol tcp
port 80
keepalive url "/sms-tnt/HTML/public/ServerUp.htm"
keepalive type http
active At step 207, the switch 102 selects a new server 103 responsive to a positive determination at step 206. After step 207, the method returns to step 206, wherein another determination is made whether the new selected server 103 is presently draining. The steps of determination 206 and selection 207 continue until the switch 102 selects a server 103 that is not draining or until the servers have been selected. If the selected servers in the server farm 103 are presently draining, the switch cannot start a new business session. In this case, the switch 102 may respond in one or more ways including, without limitation, continue selecting a new server until selecting one that is not draining, notifying the client 115 that no servers are presently available, redirecting the request to another server farm, dropping the request, etc.

At communication 208, the second communication path 105 communicates information for the selected server 103 from the switch 102 to the server(s) 103 responsive to a negative determination at step 206.

At step 209, the server 103 starts a new business session, retrieves data for the new business session, and sends the data for the new business session to the switch 102 responsive to the communication 208.

At communication 210, the second communication path 105 communicates the data for the new business session from the server 103 to the switch 102 responsive to the step 209.

At step 211, the switch 102 receives the data for the new business session responsive to the communication 210.

At step 212, the switch 102 transmits the data for the new business session to the client 101 responsive to the step 211.

At communication 213, the first communication path 104 communicates the data for the new business session from the switch 102 to the client 101 responsive to the step 212.

At step 214, the client 101 receives the data for the new business session from the client responsive to the communication 213.

At communication 215, the second communication path 105, communicates information about the business session from the switch 102 to the server 103 responsive to a negative determination (i.e., to obtain data for an ongoing business session or stateless information) at step 204.

At step 216, the server 103 receives a request for data for the ongoing business session or stateless information from the switch 102 responsive to the communication 215. Hence, when the switch 102 makes a negative determination at step 204, the HTTP requests from the client 101 for data for an ongoing business session or stateless information are directed to a server 103, without checking if the server is being drained at step 206.

Preferably, when a server 103 that is processing a request for stateless information is shut down (i.e., taken out of service), the switch 102 detects that server 103 will be or is shutting down or has shut down and redirects the request for stateless information to another server 103. Redirecting the request for the stateless information from one server to another server will not interrupt the execution of the associated business session because the requested information is stateless.

Preferably, a server 103 that is processing a request for an ongoing business session should not be shut down (i.e., taken out of service) before the server 103 finishes the business sessions that it is running (i.e., actively serving). Shutting down a server 103 that is running an ongoing business session will interrupt the ongoing business session thereby causing an interruption in service.

The server 103 retrieves the data for the ongoing business session or stateless information, and transmits the data for the ongoing business session or stateless information to the switch 102.

At communication 217, the second communication path 105 communicates the data for the ongoing business session or stateless information from the server 103 to the switch 102 responsive to the step 216.

At step 218, the switch 102 receives the data for the ongoing business session or stateless information responsive to the communication 217.

At step 219, the switch 102 transmits the data for the ongoing business session or stateless information to the client 101 responsive to the step 218.

At communication 220, the first communication path 104 communicates the data for the ongoing business session or stateless information from the switch 102 to the client 101 responsive to step 219.

At step 221, the client 102 receives the data for the ongoing business session or stateless information from the switch 102 responsive to the communication 220.

The system 100 and method 200 may be used in any server environment that needs to drain one or more servers, such as those servers that run stateful business sessions. The system 100 and method 200 permits one or more servers 103 to be drained in a manner that is transparent to the client 101. The switch 102 filters the HTTP requests received from the client 101 by examining information (e.g., the domain name in the URL or other identifiable pattern) in the HTTP requests with the content rules 123. HTTP requests from clients that are for new business sessions are directed to servers 103 that are not draining. Servers 103 that are draining or that have drained and are taken out of service are not permitted to accept new business sessions. Servers 103 that are in the process of draining are permitted to finish ongoing business sessions or to provide stateless information. The servers that are in the process of draining may also implement a business session time out in combination with the method 200 to increase the rate of draining. After the ongoing business sessions have finished on a particular server (i.e., the particular server has been drained of the ongoing business sessions), the particular server 103 may be taken off line (i.e., no longer available for the clients to access) from the server farm. Hence, the system 100 and method 200 support a gradual removal of a server from a server farm for server maintenance, and significantly reduces the negative impact on users of the client 101 when the servers are drained and removed.

As an alternative approach to the switch 102 making the determination at step 206 in FIG. 2, the server 103 itself may decide if the server 103 should accept certain HTTP requests based on the server's own status (e.g. being drained or not). However, the alternative approach would require the server 103 to know its own status and know the status of other servers in the server farm. Therefore, the alternative approach may increase complexity and inefficiency of the implementation.

Next, FIGS. 3 and 4 are described together. FIG. 3 illustrates a user interface window 300 showing an active server icon 301 having a file name, for example, "ServerUp.htm," in accordance with a preferred embodiment of the present invention. FIG. 4 illustrates a user interface window 400 showing a draining server icon 401 having a file name, for example, "ServerDrain.htm," in accordance with a preferred embodiment of the present invention. Preferably, the user interface windows 300 and 400 are part of server management software 131 in the server 103. Preferably, the windows 300 and 400 are provided by a display (otherwise called a "display generator") in the user interface 137 in the server 103. The method 200 permits a server administrator to perform maintenance on a particular server 103, without accessing the switch 102, by changing a file name for the particular server to start the draining process for the particular server 103. Preferably, changing a file name for a server corresponds to changing a destination address for the server. For example, the file name for a particular server 103 may be changed from "ServerUp.htm" to "ServerDrain.htm" to drain the particular server 103. After changing the file name to "ServerDrain.htm," the particular server 103 is added to a list of servers being drained for consideration in step 206 of FIG. 2, wherein a determination is made as to whether the selected server is being drained. Conversely, after changing the file name back to "ServerUp.htm," the particular server 103 is removed from the list of servers being drained for consideration in step 206 of FIG. 2 to permit the particular server 103 to accept new business sessions.

Changing the file name in this manner does not require the server administrator to directly access the switch 102 because the file name is changed in the server farm. Changing the file name in this manner simplifies life for the server administrators and permits a separation of tasks between the server administrators in charge of the servers 103 and the network administrators in charge of the switch 102 who are responsible for a wider range of customers. Server administrators may focus on servicing the servers 103 in a manner that is transparent to the client 101, without cooperating with the network administrators.

Figure 5:
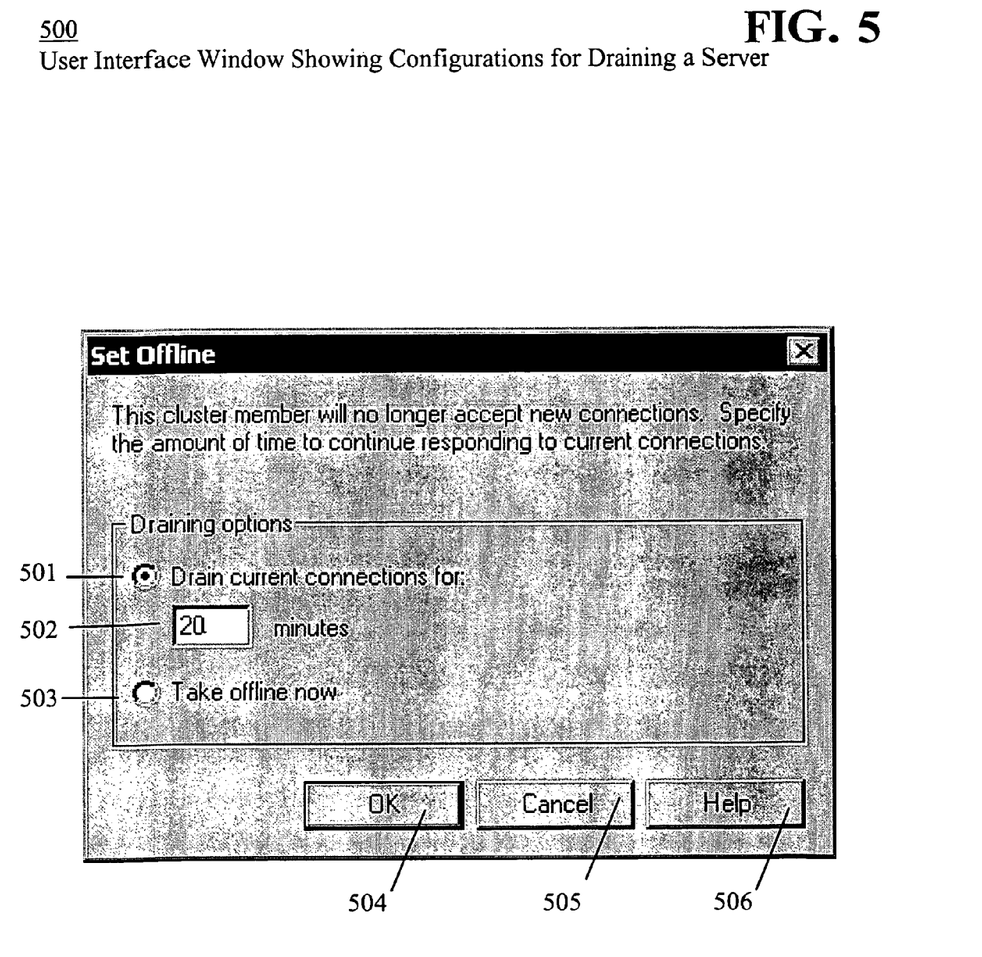
FIG. 5 illustrates a user interface window showing configurations for draining a server, in accordance with a preferred embodiment of the present invention.

FIG. 5 illustrates a user interface window 500 showing exemplary configurations for draining a server, in accordance with a preferred embodiment of the present invention. The window 500 generally includes an option to drain current connections 501, a drain time limit 502, and an option to take off line now 503, as well as an OK 504, Cancel 505, and Help 506 selection boxes. Preferably, the window 500 is provided by a display (otherwise called a "display generator") in the user interface 137 in the server 103. The drain time limit 501 permits the server administrator to input a predetermined time limit, such as twenty minutes, that ongoing business sessions may continue on a draining server before the server is taken off line. Various other display types, such as alpha, numeric, or graphical displays may be used to implement the user interface window 500 for the server draining process.

The system 100 and method 200 may be incorporated into server management software 131 (e.g., Microsoft Windows 2000 Advanced Data Center) in the server 103 to permit servers to accept certain HTTP requests, while rejecting other requests during server draining in the existing HTTP connections. For example, the system 100 and method 200 may be added to existing server management software through either a completely new server-draining feature or through enhancement of the existing server draining feature. The enhancement would permit users to define what kinds of HTTP requests a server would accept during its draining. The request method may be implemented using a URL pattern definition field added to the server management software's dialog box.

Figure 6:
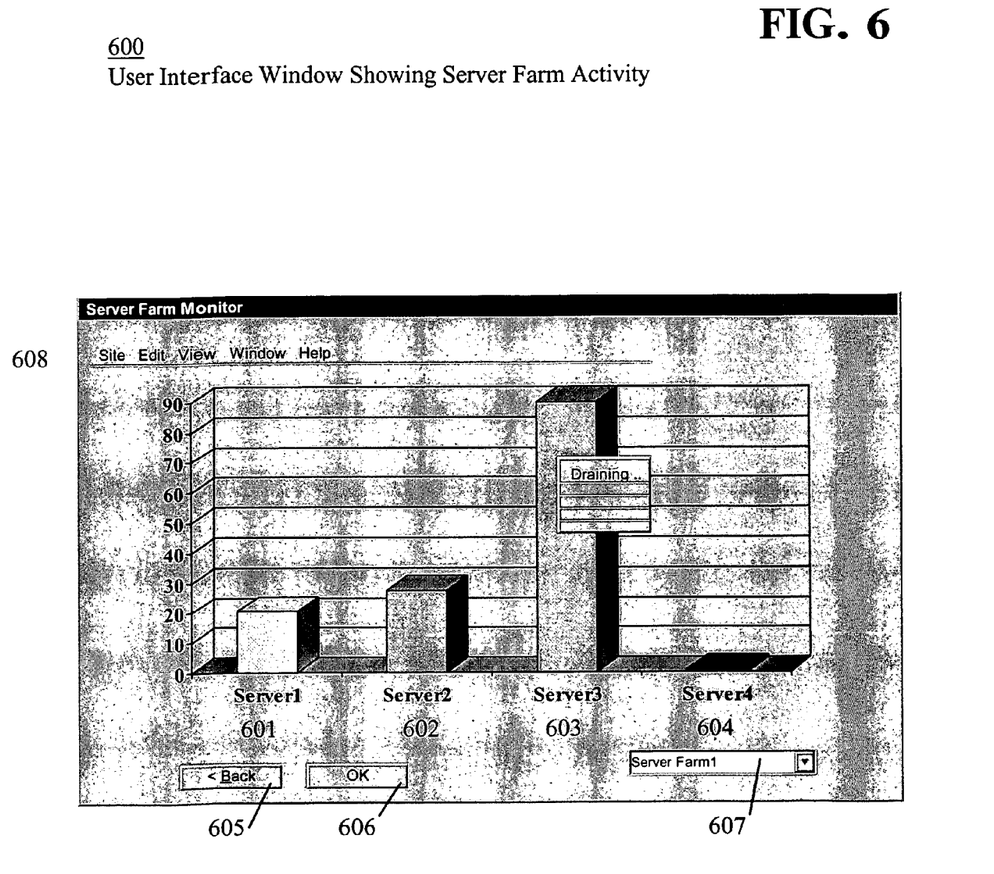
FIG. 6 illustrates a user interface window showing server farm activity, in accordance with a preferred embodiment of the present invention.

FIG. 6 illustrates a user interface window 600 showing exemplary server farm activity, in accordance with a preferred embodiment of the present invention. Preferably, the window 600 is incorporated into server farm management software in the server 103. Preferably, the window 600 is provided by a display (otherwise called a "display generator") in the user interface 137 in the server 103. The window 600 generally includes a vertical bar for each server 601-604, back 605 and OK 606 selection boxes, a server farm selection menu 607, and a general menu 608. The server farm selection menu 607 permits the server administrator to select among various server farms. The height of the vertical bar for each server 601-604 represents the number of business sessions running on the servers. The vertical bars are color coded to indicate the status of the servers. A green bar indicates that a server is running normally. A yellow bar indicates that a server is being drained. A red bar indicates that a server has finished draining and is ready to be taken out from the server farm. Users may click on a green bar to initiate the draining of the server. Various other display types, such as alpha, numeric, or graphical displays may be used to implement the user interface window 600 for the server draining process.

Hence, while the present invention has been described with reference to various illustrative embodiments thereof, the present invention is not intended that the invention be limited to these specific embodiments. Those skilled in the art will recognize that variations, modifications, and combinations of the disclosed subject matter can be made without departing from the spirit and scope of the invention as set forth in the appended claims.

What is claimed is:

1. A data switching system for directing requests to initiate a new operation session of an executable application, comprising:
   a switch processor for,
      parsing received data representing a received URL to identify whether said received URL is associated with a request to initiate an operation session of an executable application, and if said received URL is associated with a request to initiate an operation session,
      initiating a data access request at a second URL address hosted by a particular server; and
      in response to receiving a response indicating failure of said data access request at said second URL address hosted by said particular server,
      directing said request to initiate said operation session of said executable application to a server other than said particular server, said failure resulting from a change of destination address stored in said particular server made without accessing said switch processor.

2. A system according to claim 1, wherein
   said change of destination address stored in said particular server comprises change of file name of said particular server and
   said received URL is at least one of, (a) the same as said second URL and (b) different to said second URL.

3. A system according to claim 1, wherein
   in response to receiving a response indicating failure of said data access request at said second URL address hosted by said particular server,
   directing said request to initiate said operation session of said executable application to a server other than said particular server and
   in response to receiving a response indicating success of said data access request at said second URL address hosted by said particular server,
   directing said request to initiate said operation session of said executable application to said particular server.

4. A system according to claim 1, wherein
   said failure response results from a user changing a destination address stored in said particular server, said destination address corresponding to said second URL address, said failure indicating said particular server is not accepting requests to initiate an operation session of an executable application.

5. A system according to claim 1, wherein
   said switch processor,
   parses data representing a URL to identify whether a URL is associated with a data request of a first or different second type, and
   processes said URL associated data request of a first type differently to a URL associated data request of a second type.

6. A system according to claim 5, wherein
   said switch processor parses data representing a URL to identify whether a URL associated data request is of a first type by determining if a URL data field identifies a server.

7. A system according to claim 6, wherein
   said switch processor parses data representing a URL to identify whether a URL associated data request is of a first type by determining if a URL data field contains an ASP extension.

8. A system according to claim 1, wherein
said switch processor parses data representing a URL to identify whether a URL is stateless.
9. A system according to claim 8, wherein
said switch processor determines if a URL is stateless by determining if a URL data field contains at least one of, (a) a .gif extension, (b) a .js extension (c) a .jpeg extension and (d) a .html extension.
10. A system according to claim 1, wherein
said switch processor redirects a stateless data request directed to said particular server to a server different to said particular server in response to receiving a response indicating failure of said data access request at said second URL address hosted by said particular server.
11. A system according to claim 1, wherein
a URL associated data request of a first type is performable by a particular server and
a URL associated data request of a second type is performable by a plurality of different servers.
12. A system enabling a user to reduce workload of a server to support maintenance of said server, comprising:
an interface processor in a particular server for
changing a destination address stored in said particular server from a first destination address to a second destination address without accessing a remote switch processor, in response to user command, said change to said second destination address being used to identify said particular server is unavailable for initiation of new operation sessions of applications,
receiving a URL request to access data at said first destination address from said switch processor,
determining said URL request to access data cannot be accomplished because of said changed destination address and
initiating communication of a message identifying failure of said data access request to said switch processor.
13. A system according to claim 12, wherein
said change of destination address stored in said particular server comprises change of file name of said particular server and
said message identifying failure of said data access request indicates said particular server is unavailable for initiation of new operation sessions of applications.
14. A system according to claim 12, wherein
said interface processor parses data representing a URL to identify whether a URL associated data request is associated with a previously initiated operation session of an application.
15. A system according to claim 12, wherein
said interface processor terminates a previously initiated operation session of an application in response to a timeout command.
16. A system according to claim 12, including
a display generator for initiating generation of data representing at least one display image enabling user entry of a command changing a destination address stored in said particular server from a first destination address to a second destination address.
17. A system according to claim 12, wherein
said interface processor in said particular server changes a destination address stored in said particular server from a second destination address to a first destination address, in response to user command, said change to said first destination address being used to identify said particular server is available for initiation of new operation sessions of applications.
18. A user interface system stored on a computer-readable medium enabling a user to reduce workload of a server to support maintenance of said server, comprising: a display generator for initiating generation of data representing at least one display image, enabling user entry of a command changing a destination address stored in a particular server from a first destination address to a second destination address without accessing a remote switch processor communicating with said particular server, said change to said second destination address being used to identify said particular server is unavailable for initiation of new operation sessions of applications and in response to failure of said command indicating said failure by an indicator in said at least one display image.

* * * * *